United States Patent
Hattori

(10) Patent No.: US 10,981,599 B2
(45) Date of Patent: Apr. 20, 2021

(54) AUTOMATED PARKING SYSTEM, AUTOMATED PARKING VEHICLE, AND AUTOMATED PARKING METHOD

(71) Applicant: DENSO CORPORATION, Kariya (JP)

(72) Inventor: Yosuke Hattori, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/677,281

(22) Filed: Nov. 7, 2019

(65) Prior Publication Data
US 2020/0070890 A1    Mar. 5, 2020

Related U.S. Application Data

(63) Continuation of application No. PCT/JP2018/017795, filed on May 8, 2018.

(30) Foreign Application Priority Data

May 9, 2017    (JP) .............................. JP2017-092825

(51) Int. Cl.
| | |
|---|---|
| *B60W 30/06* | (2006.01) |
| *B62D 15/02* | (2006.01) |
| *G05D 1/00* | (2006.01) |
| *G05D 1/02* | (2020.01) |
| *G06K 9/00* | (2006.01) |
| *G08G 1/14* | (2006.01) |

(52) U.S. Cl.
CPC ....... *B62D 15/0285* (2013.01); *G05D 1/0088* (2013.01); *G05D 1/0214* (2013.01); *G06K 9/00812* (2013.01); *G08G 1/144* (2013.01); *G06T 2207/30264* (2013.01)

(58) Field of Classification Search
None
See application file for complete search history.

(56) References Cited

U.S. PATENT DOCUMENTS

| | | |
|---|---|---|
| 2012/0188100 A1 | 7/2012 | Min et al. |
| 2016/0063862 A1* | 3/2016 | Rosen .................... G08G 1/144 340/932.2 |

(Continued)

FOREIGN PATENT DOCUMENTS

| | | |
|---|---|---|
| JP | H10-074300 A | 3/1998 |
| JP | 2009-276927 A | 11/2009 |

(Continued)

*Primary Examiner* — John F Mortell
(74) *Attorney, Agent, or Firm* — Maschoff Brennan

(57) ABSTRACT

An automated parking system includes an automated parking vehicle and an information terminal. The vehicle includes a parking control device and a communication device. The parking control device controls the vehicle to cause the vehicle to search for and park in a vacant parking slot by means of autonomous travel. The communication device transmits automated parking status information to the information terminal when no vacant parking slot is found. Furthermore, the communication device receives an instruction about status control of the vehicle from the information terminal. The information terminal includes a communication device. The parking control device controls the vehicle according to the instruction about the status control of the vehicle that has been received from the information terminal.

14 Claims, 6 Drawing Sheets

(56) References Cited

U.S. PATENT DOCUMENTS

2017/0118307 A1* 4/2017 Beaurepaire ............ G08G 1/143
2017/0137024 A1* 5/2017 Elie .................... G06K 9/00812

FOREIGN PATENT DOCUMENTS

| JP | 2014-144708 A | 8/2014 |
| JP | 2016-076014 A | 5/2016 |
| JP | 2017-211715 A | 11/2017 |
| WO | 2017/168754 A1 | 10/2017 |

* cited by examiner

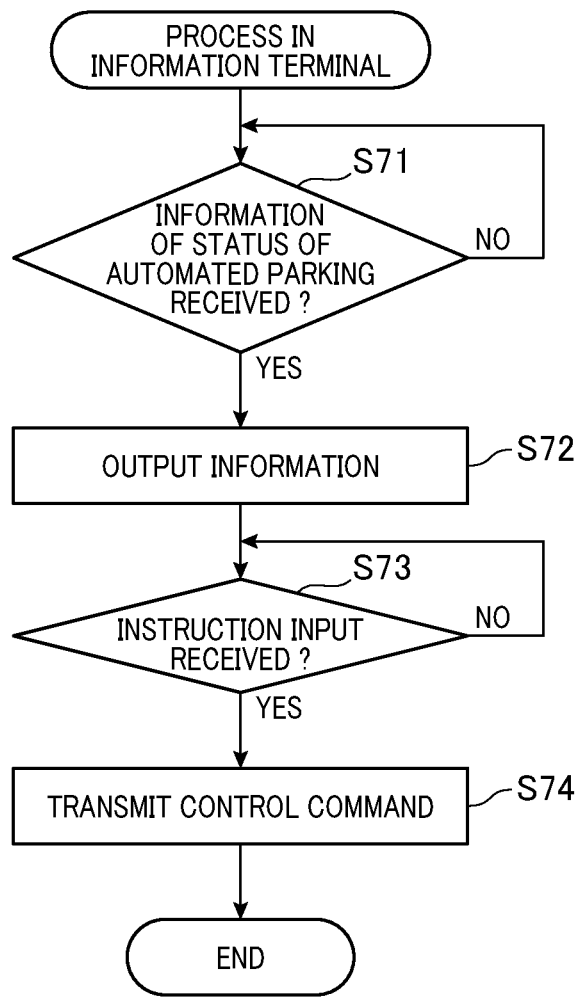

AUTOMATED PARKING SYSTEM, AUTOMATED PARKING VEHICLE, AND AUTOMATED PARKING METHOD

CROSS-REFERENCE TO RELATED APPLICATION

The present application is a continuation application of International Application No. PCT/JP2018/017795, filed May 8, 2018, which claims priority to Japanese Patent Application No. 2017-092825, filed May 9, 2017. The contents of these applications are incorporated herein by reference in their entirety.

BACKGROUND

1. Technical Field

The present disclosure relates to an automated parking technique.

2. Related Art

As automated driving application, an automated valet parking system for allowing a vehicle to autonomously travel to a vacant parking slot and automatically park therein is known.

SUMMARY

The present disclosure provides an automated parking system. An automated parking system that is a mode of the present disclosure includes a vehicle and an information terminal. The vehicle includes a parking control unit and an instruction reception unit. The parking control unit controls the vehicle to search for and park in a vacant parking slot by means of autonomous travel. The instruction reception unit receives an instruction about status control of the vehicle for when no vacant parking slot is found. The information terminal includes an instruction unit. The instruction unit provides the instruction to the instruction reception unit. When no vacant parking slot is found as a result of searching, the parking control unit controls the vehicle according to the instruction received by the instruction reception unit.

BRIEF DESCRIPTION OF THE DRAWINGS

In the accompanying drawings:

FIG. 7 is a flowchart showing processes in an information terminal according to the embodiment of the present disclosure.

DETAILED DESCRIPTION OF THE PREFERRED EMBODIMENTS

Figure 1:
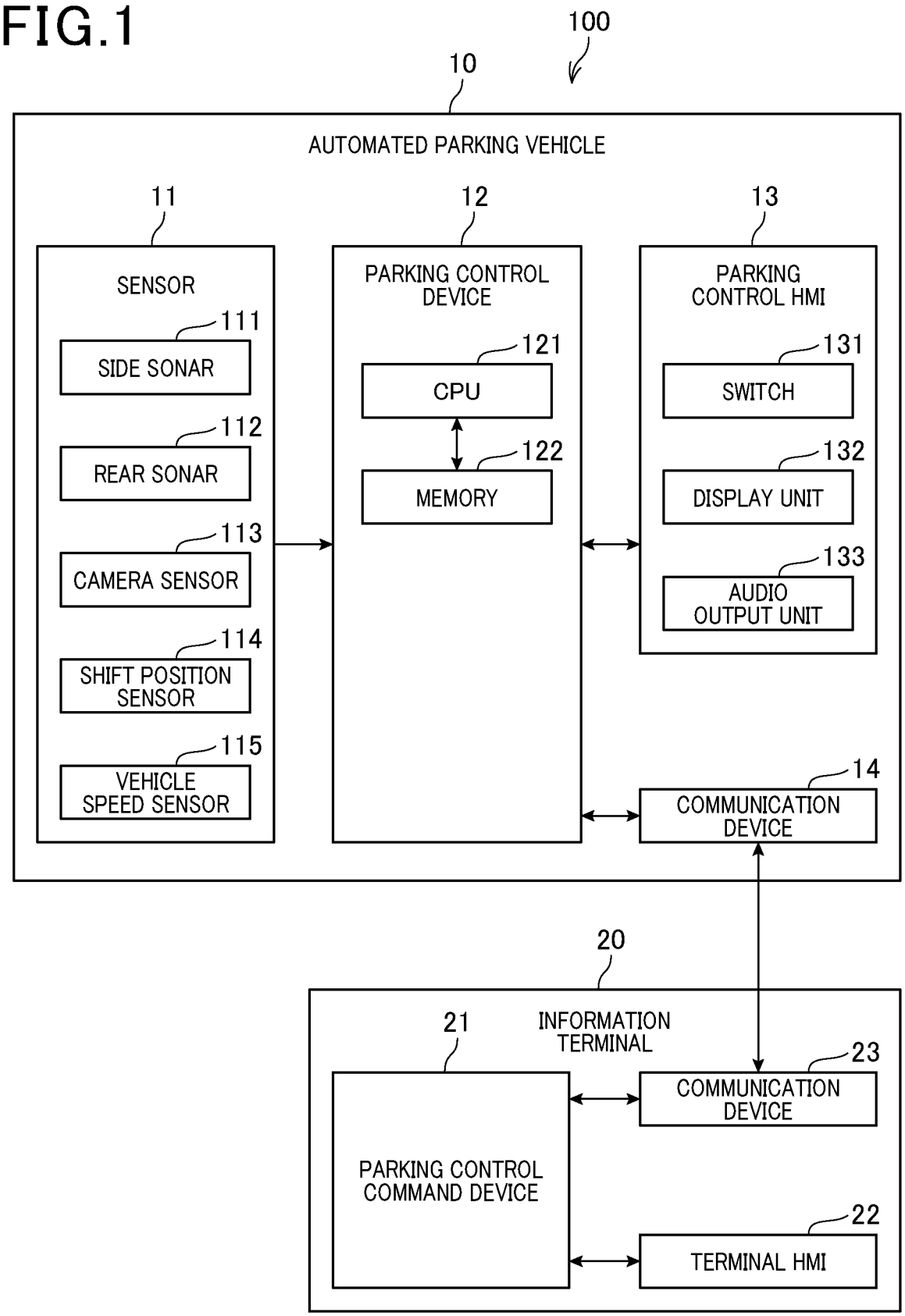
FIG. 1 is a block diagram showing the configuration of an automated parking system according to an embodiment of the present disclosure.

As automated driving application, an automated valet parking system for allowing a vehicle to autonomously travel to a vacant parking slot and automatically park therein is known (for example, JP 2016-076014 A). One exemplary type of such an automated valet parking system is a central control type. In the case of the central control type, a central control device allocates, in advance, a vacant parking slot to a vehicle supporting automated valet parking. Thus, the vehicle autonomously travels and parks in the allocated parking slot. Another exemplary type is an autonomous search type. In the case of the autonomous search type, a vehicle searches for a vacant parking slot by itself using a sensor or the like and parks in the vacant parking slot that has been found.

In the case of the autonomous search type, when no vacant parking slot is found, the vehicle keeps on searching for a vacant parking slot until a parking slot becomes available as a result of a vehicle already parked exiting the parking lot. Furthermore, even if a parking slot becomes available, another vehicle waiting for a parking slot may park in the parking slot that has become available. In this case, the time taken to find a vacant parking slot becomes longer.

As just described, if no vacant parking slot is found and a vehicle continues to autonomously travel while searching for a vacant parking slot, the parking lot is congested with vehicles waiting for parking. Furthermore, the vehicles waiting for parking waste energy which consumes by driving until it can park.

The present disclosure provides a technique about automated parking in which, when no vacant parking slot is found, a vehicle waiting for parking is properly controlled.

One mode of the technique according to the present disclosure is an automated parking system including: a vehicle; and an information terminal, wherein the vehicle includes: a parking control unit which controls the vehicle to search for and park in a vacant parking slot by means of autonomous travel; and an instruction reception unit which receives an instruction about status control of the vehicle for when no vacant parking slot is found, the information terminal includes an instruction unit which provides the instruction to the instruction reception unit, and when no vacant parking slot is found as a result of searching, the parking control unit controls the vehicle according to the instruction received by the instruction reception unit.

In the technique according to the present disclosure, this configuration allows the automated parking system to properly control a vehicle waiting for parking when no vacant parking slot is found.

Another mode of the technique according to the present disclosure is an automated parking vehicle including: a parking control unit which controls the automated parking vehicle to search for and park in a vacant parking slot by means of autonomous travel; and an instruction reception unit which receives an instruction about status control of the automated parking vehicle for when no vacant parking slot is found, wherein when no vacant parking slot is found as a result of searching, the parking control unit controls the automated parking vehicle according to the instruction received by the instruction reception unit.

In the technique according to the present disclosure, this configuration also allows the automated parking system to properly control a vehicle waiting for parking when no vacant parking slot is found.

Another mode of the technique according to the present disclosure is an automated parking method including the steps of: controlling parking by causing a vehicle to search for and park in a vacant parking slot while causing the vehicle to autonomously travel; receiving an instruction about status control of the vehicle for when no vacant parking slot is found; and controlling the vehicle according to the received instruction when no vacant parking slot is found as a result of searching.

In the technique according to the present disclosure, this configuration also allows the automated parking system to properly control a vehicle waiting for parking when no vacant parking slot is found.

Hereinafter, an embodiment of the technique according to the present disclosure will be described with reference to the drawings. Note that the embodiment described below indicates one example of implementation of the technique according to the present disclosure. Thus, the technique according to the present disclosure is not limited to the specific configuration described below. Upon implementation of the technique according to the present disclosure, a specific configuration dependent on an embodiment may be applied, as appropriate.

FIG. 1 is a block diagram showing the configuration of an automated parking system according to the present embodiment. An automated parking system 100 includes: a vehicle (automated parking vehicle) 10 supporting automated parking; and an information terminal 20. For example, when receiving an automated parking instruction after occupants including a driver alight from the vehicle 10 in an alighting space, the vehicle 10 with no occupants autonomously travels and parks in a vacant parking slot in a parking lot. Furthermore, for example, when the vehicle 10 parked in the parking lot receives a vehicle retrieval instruction, the vehicle 10 with no occupants autonomously travels from the parking position in the parking lot to a boarding space, and stops.

The information terminal 20 is a terminal device carried by a user. The user is, for example, the driver of the vehicle 10. The vehicle 10 performs wireless communication with the information terminal 20, as appropriate, during automated parking. Specifically, the vehicle 10 communicates with the information terminal 20 until the vehicle 10 is parked after the driver alights from the vehicle 10. Furthermore, the vehicle 10 communicates with the information terminal 20 until the vehicle 10 stops in a boarding space after the vehicle retrieval instruction is received from the driver.

Various communication methods may be used for the wireless communication between the vehicle 10 and the information terminal 20. Furthermore, another device may be interposed between the vehicle 10 and the information terminal 20. Note that examples of another device include a central management device which manages the entire parking lot.

An instruction from a user is transmitted from the information terminal 20 to the vehicle 10 via wireless communication. Note that examples of the instruction from a user include an automated parking start instruction, a vehicle retrieval instruction, and an automated parking continuance instruction.

Information about the vehicle 10 and the status of automated parking is transmitted from the vehicle 10 to the information terminal 20. For example, when automated parking of the vehicle 10 is completed, information to report the completion of parking is transmitted from the vehicle 10 to the information terminal 20. Furthermore, if no vacant parking slot is found, inquiry information about the automated parking continuance instruction is transmitted from the vehicle 10 to the information terminal 20.

The automated parking in the present embodiment include parking and retrieval of the vehicle 10. Thus, in the present embodiment, the vehicle 10 supporting automated parking has the following configuration. Specifically, as shown in FIG. 1, the vehicle 10 includes a sensor 11, a parking control device 12, a parking control HMI 13, and a communication device 14.

The sensor 11 obtains information about the vehicle 10 and information about the vicinity of the vehicle 10. In the present embodiment, the sensor 11 includes a side sonar 111, a rear sonar 112, a camera sensor 113, a shift position sensor 114, and a vehicle speed sensor 115. The side sonar 111 is provided on a side surface of the vehicle 10 (hereinafter also referred to as the "own vehicle"). For example, the side sonar 111 transmits a sound wave laterally with respect to the vehicle 10 and receives a reflected wave. This allows the side sonar 111 to detect the presence or absence of an object located on the side of the own vehicle and the distance between the own vehicle and the object.

The rear sonar 112 is provided on a rear surface of the vehicle 10. For example, the rear sonar 112 transmits a sound wave rearward with respect to the vehicle 10 and receives a reflected wave. This allows the rear sonar 112 to detect the presence or absence of an object located behind the own vehicle and the distance between the own vehicle and the object. The detection results of the side sonar 111 and the rear sonar 112 are transmitted to the parking control device 12.

The camera sensor 113 is provided on a front surface of the vehicle 10. For example, the camera sensor 113 captures an image of an area in front of the vehicle 10 and performs image processing on the captured image. This allows the camera sensor 113 to detect the presence of a parking lot, a parking slot, or the like and the presence or absence of a vehicle waiting for parking (hereinafter also referred to as "another vehicle") different from the own vehicle. The detection result of the camera sensor 113 is transmitted to the parking control device 12. Note that in the present embodiment, the parking slot represents a sectioned area in a parking lot for a vehicle to park. The vacant parking slot represents a parking slot in which no vehicle is parked.

Note that the camera sensor 113 may be provided on the rear surface of the vehicle 10 to capture an image of an area behind the vehicle 10. In this case, the camera sensor 113 may detect the presence or absence of an object located behind the own vehicle and the distance between the own vehicle and the object, instead of the rear sonar 112. Alternatively, the camera sensor 113 may detect the presence or absence of an object located behind the own vehicle and the distance between the own vehicle and the object, in addition to the rear sonar 112.

The shift position sensor 114 detects the position of a shifter. The detection result of the shift position sensor 114 is transmitted to the parking control device 12. Note that in the parking control device 12, the detection result is used to recognize the position (for example, any position among parking "P", reverse "R", neutral "N", and drive "D") of the shifter currently specified.

The vehicle speed sensor 115 detects the travel speed of the vehicle 10. The detection result of the vehicle speed sensor 115 is transmitted to the parking control device 12.

The parking control HMI 13 is an interface for facilitating information exchange between the vehicle 10 and occupants including a driver. In the present embodiment, the parking control HMI 13 includes a switch 131, a display unit 132, and an audio output unit 133. The switch 131 is used, for example, by a driver to input, to the parking control device 12, an instruction to start automated parking. The switch 131 transmits an input signal corresponding to a user operation to the parking control device 12. As a result, according to the input signal, the parking control device 12 recognizes the operation received from the driver.

The display unit 132 is, for example, a display, and displays an image, text information, and so on in response to an instruction from the parking control device 12. The audio output unit 133 is, for example, a loudspeaker, and outputs a warning sound using a buzzer sound, speech, etc., in response to an instruction from the parking control device 12. The display unit 132 and the audio output unit 133 are used for informing occupants including a driver of the actuation status of automated parking.

The communication device 14 causes data to be transmitted and received between another vehicle and the own vehicle. Furthermore, the communication device 14 causes data to be transmitted and received between the information terminal 20 and the vehicle 10. Note that in the present embodiment, a wireless communication device is exemplified as the communication device 14. The communication device 14 transmits and receives information of the position of the own vehicle, the time of waiting for parking for the own vehicle, or the like to and from another vehicle via inter-vehicle communication. Furthermore, the communication device 14 transmits information of the status of automated parking to the information terminal 20. The communication device 14 receives an instruction about status control of the vehicle 10 from the information terminal 20. Not that in the case of transmitting the information of the status of automated parking to the information terminal 20, the communication device 14 functions as a notification transmission unit. In the case of receiving an automated parking continuance instruction corresponding to the instruction about status control of the vehicle 10 from the information terminal 20, the communication device 14 functions as an instruction reception unit. Note that in the present embodiment, a wireless communication device is exemplified as the communication device 14.

The parking control device 12 is mainly composed of a microcomputer including, for example, a central processing unit (CPU) 121, a memory 122, and an input/output (I/O) interface (not shown in the drawings). Note that the memory 122 is, for example, a semiconductor memory such as a read-only memory (ROM), a random-access memory (RAM), and a flash memory. The CPU 121 executes a program stored in a non-transitory, tangible recording medium. Processes for implementing functions are defined in the program. Thus, the functions of the parking control device 12 are implemented by the CPU 121 executing the program. Note that in the present embodiment, the memory 122 corresponds to the non-transitory, tangible recording medium. The non-transitory, tangible recording medium means a recording medium that excludes electromagnetic waves. Note that the number of microcomputers included in the parking control device 12 may be one or may be more than one.

In the present embodiment, the parking control device 12 has the function of performing automated parking as one of the functions implemented by executing the program. Note that the method for implementing the functions of the parking control device 12 is not limited to software. As another method, part or all of the elements in the functions may be implemented using hardware including a combination of a logic circuit, an analog circuit, and the like, for example.

The information terminal 20 includes a parking control command device 21, a terminal HMI 22, and a communication device 23. The communication device 23 causes data to be transmitted and received between the information terminal 20 and the vehicle 10. Note that in the present embodiment, a wireless communication device is exemplified as the communication device 23. The communication device 23 receives the information of the status of automated parking from the vehicle 10. Furthermore, the communication device 23 transmits the automated parking continuance instruction to the vehicle 10. Note that in the present embodiment, a wireless communication device is exemplified as the communication device 23.

The terminal HMI 22 is an interface for exchanging information between the information terminal 20 and occupants including a driver (hereinafter also referred to as "a user" or "users"). In the present embodiment, the terminal HMI 22 includes a touch panel, a loudspeaker, a microphone, and the like. The terminal HMI 22 includes a display unit (not shown in the drawings) and/or an audio output unit (not shown in the drawings). The terminal HMI 22 outputs the information of the status of automated parking received from the vehicle 10. Furthermore, the terminal HMI 22 receives a user input about the automated parking continuance instruction. Note that outputting of the information may be displaying on a display or may be outputting of audio from a loudspeaker, for example. Inputting of the information may be inputting to a touch panel or may be inputting of audio through a microphone, for example. In other words, in the present embodiment, it is sufficient that the terminal HMI 22 be configured to be able to inform a user of the information and receive the information from a user.

The parking control command device 21 controls the communication device 23 and the terminal HMI 22 to perform an automated parking control command process for the vehicle 10.

Next, the automated parking process performed by the parking control device 12 is described with reference to the flowchart shown in FIG. 2. The automated parking process is to assist the operation conducted by the driver parking the own vehicle in a vacant parking slot in a parking lot. For example, when power to the vehicle 10 is turned on, the automated parking process is started and then repeatedly performed.

In the automated parking process, first, the parking control device 12 recognizes the travel distance of the own vehicle using the detection result of the vehicle speed sensor 115. In addition, the parking control device 12 recognizes the presence or absence of an object on the side of the own vehicle and the distance between the own vehicle and the object using the detection result of the side sonar 111 (Step S21). As a result, the parking control device 12 stores the relationship between the travel distance of the own vehicle and the detection result of the object on the side of the own vehicle into a predetermined storage region of the memory 122 as data.

Figure 3:
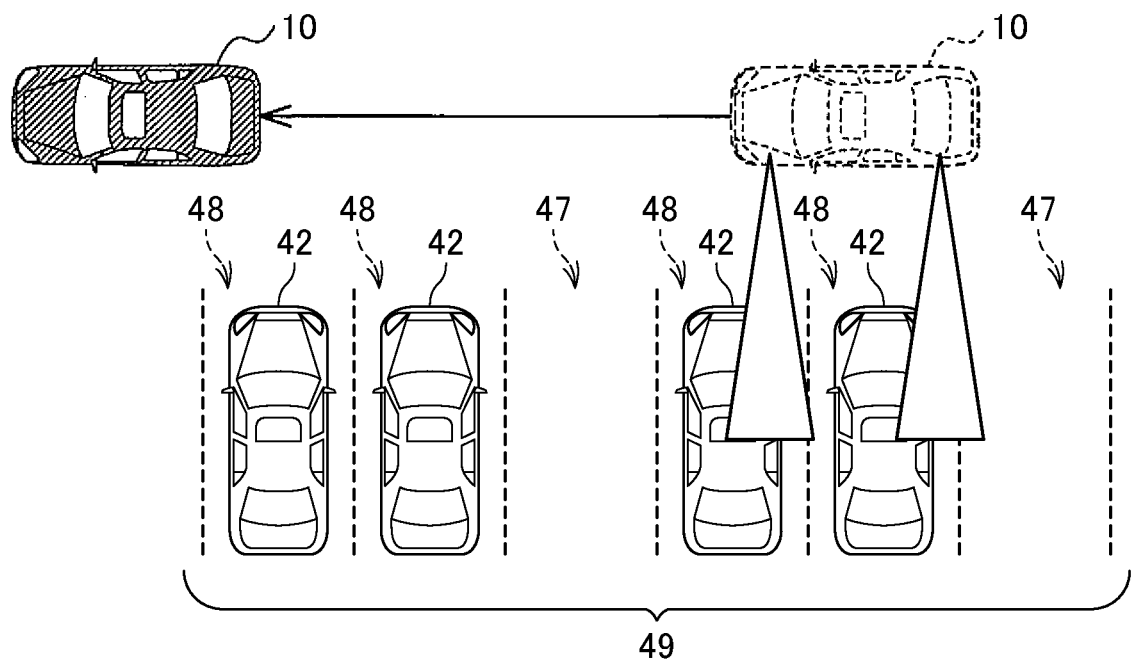
FIG. 3 is a diagram for explaining the process of searching for a vacant parking slot by a vehicle according to the embodiment of the present disclosure.
Figure 4:
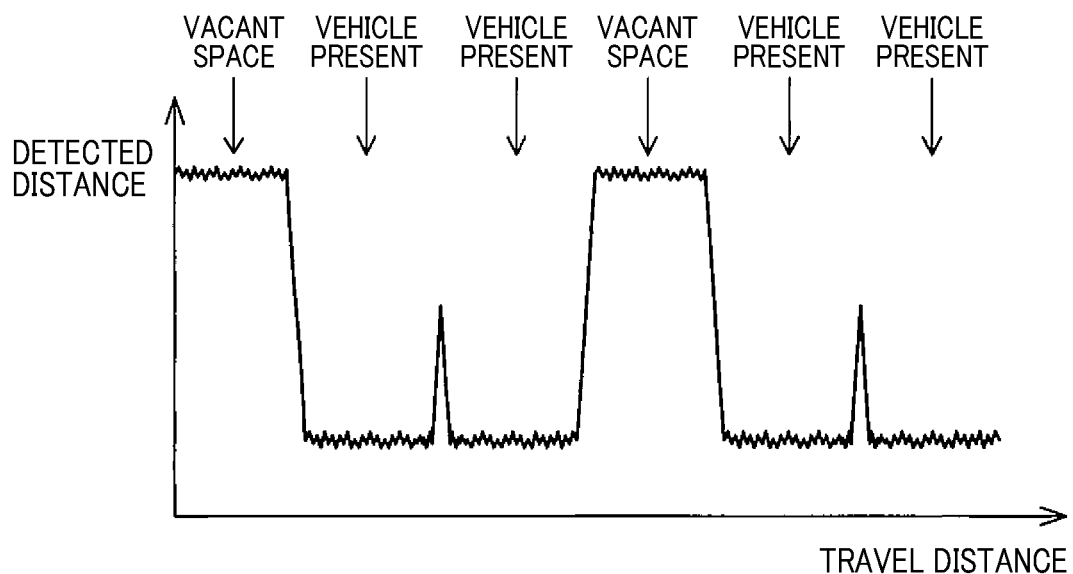
FIG. 4 is a graph showing an example of the relationship between the travel distance of the vehicle and the distance from the vehicle to an object according to the embodiment of the present disclosure.

For example, as shown in FIG. 3, the vehicle 10 supporting automated parking detects an object by transmitting a sound wave from the side sonar 111 to parking slots 49 located on the side of the own vehicle while traveling in a passage of a parking lot. As a result, for example, the result shown in FIG. 4 is obtained. Specifically, at a parking slot 48 in which a parked vehicle 42 is present among the parking slots 49, the sound wave is reflected by the parked vehicle 42, and thus the distance (detected distance) between the own vehicle and the object is short. In contrast, at a vacant parking slot 47 (vacant space) in which the parked vehicle 42 is not present among the parking slots 49, no object is present other than a road surface, and thus the detected distance between the own vehicle and the object is long.

The parking control device 12 stores the travel distance of the own vehicle and the distance between the own vehicle and the parked vehicle 42 (detected distance to an object) into the memory 122 in association with each other on the basis of the detection result before the start of automated parking. When receiving the instruction to start automated parking, the parking control device 12 accesses the memory 122 and refers to the stored correspondence data. This allows the parking control device 12 to immediately recognize the position of the vacant parking slot 47 from among the plurality of parking slots 49 in the parking lot. This means that the automated parking process can be accelerated with the parking control device 12.

The parking control device 12 determines whether the own vehicle has stopped (Step S22). In this process, for example, when the position of the shifter is detected by the shift position sensor 114 as being at the parking "P", the own vehicle is determined as having stopped. Note that the method for determining whether the own vehicle has stopped is not limited to the method based on the position of the shifter. As another method, for example, the vehicle speed sensor 115 or the like may be used for this determination. Specifically, the own vehicle may be determined as having stopped when the vehicle speed remains 0 km/h for a predetermined length of time according to the detection result of the vehicle speed sensor 115.

When determining that the own vehicle has not stopped (NO in Step S22), the parking control device 12 returns to the process in Step S21. Furthermore, the parking control device 12 continues the object recognition using the side sonar 111. On the other hand, when determining that the own vehicle has stopped (YES in Step S22), the parking control device 12 determines whether the instruction to start automated parking has been received from the user (Step S23). In this process, for example, when the switch 131 is operated, the presence of the instruction to start automated parking is determined. When determining that the instruction to start automated parking is absent (NO in Step S23), the parking control device 12 returns to the process in Step S21.

When determining the presence of the instruction to start automated parking (YES in Step S23), the parking control device 12 determines that an instruction to search for the vacant parking slot 47 has been received. As a result, the parking control device 12 searches for and recognizes the vacant parking slot 47 (Step S24). In this process, using the rear sonar 112, the camera sensor 113, the side sonar 111, or the like, the vacant parking slot 47 is recognized in a sensing range where the own vehicle can detect another vehicle. Specifically, the parking control device 12 recognizes the vacant parking slot 47 on the basis of the correspondence relationship between the travel distance of the own vehicle and the distance from the own vehicle to an object (the data stored in the memory 122 in Step S21) in the sensing range. For example, when a space of 2.5 m or more is present between detected first and second objects, the parking control device 12 recognizes the space as the vacant parking slot 47.

On the basis of the above recognition result, the parking control device 12 determines whether the vacant parking slot 47 is present (Step S25). When determining that the vacant parking slot 47 is present (YES in Step S25), the parking control device 12 transitions to the process in Step S35. On the other hand, when determining that the vacant parking slot 47 is absent (NO in Step S25), the parking control device 12 monitors new vacant parking slot availability (Step S26). Note that the "new vacant parking slot availability" indicates the transition of the state where the parking slot is not vacant to the state where the parking slot is vacant.

Figure 5:
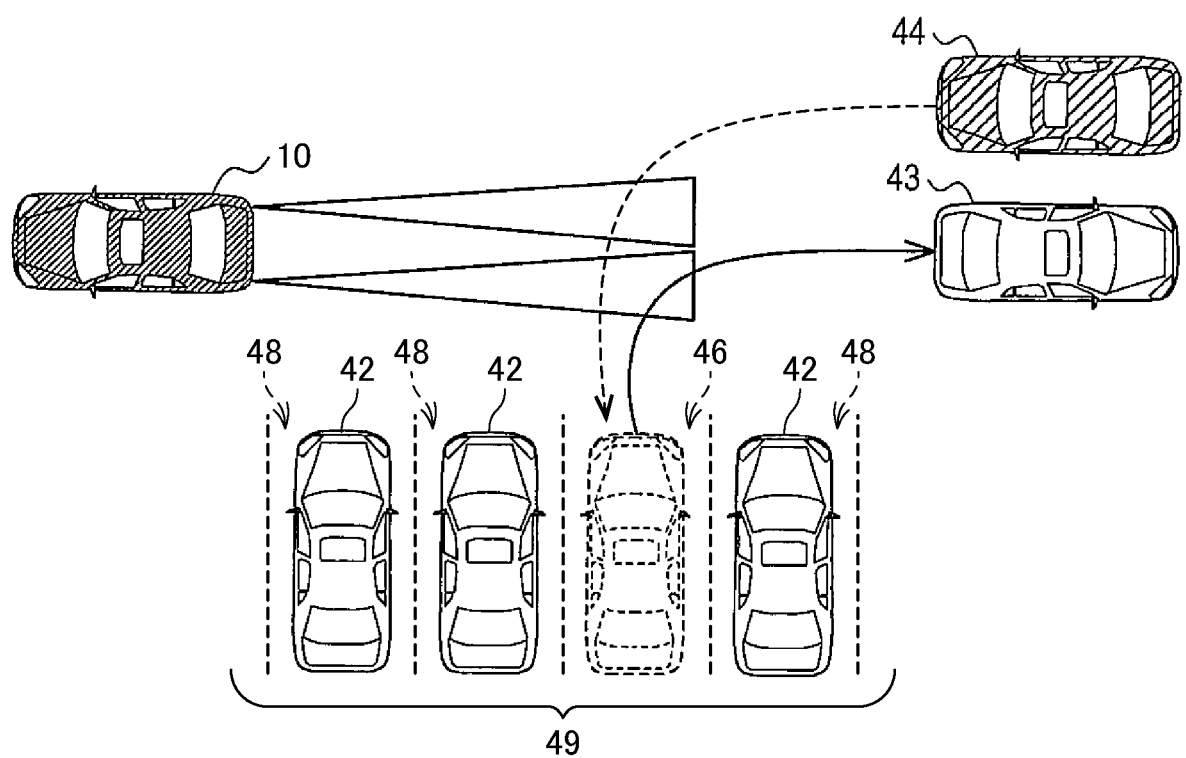
FIG. 5 is a diagram for explaining the process of monitoring new vacant parking slot availability by the vehicle according to the embodiment of the present disclosure.

For example, as shown in FIG. 5, the vehicle 10 supporting automated parking detects, using the rear sonar 112, a vehicle (another vehicle that is exiting) 43 which moves from the parking slot 48 behind the vehicle 10. This allows the parking control device 12 to monitor whether a new vacant parking slot 46 becomes available. Note that in the case where the camera sensor 113 is provided to capture an image of an area behind the vehicle 10, this camera sensor 113 may be used to detect the vehicle 43 that is moving from the parking slot 48.

On the basis of the monitoring result, the parking control device 12 determines whether the parked vehicle 42 has exited (Step S27). In this process, for example, when the vehicle 43 that is moving from the parking slot 48 to a region where the vehicle can be determined as having exited is detected using the rear sonar 112, the parked vehicle 42 is determined as having exited.

When determining that the parked vehicle 42 has not exited (NO in Step S27), the parking control device 12 returns to the process in Step S26. Furthermore, the parking control device 12 continues to monitor the new availability of the vacant parking slot 46. On the other hand, when determining that the parked vehicle 42 has exited (YES in Step S27), the parking control device 12 transmits entry information of the own vehicle to another vehicle using the communication device 14 (Step S28). Note that the "entry information" includes information of the position of the own vehicle, the position of a new vacant parking slot 46, the time elapsed since the stop of the own vehicle (hereinafter also referred to as "elapsed stop time"), etc.

The parking control device 12 determines whether the entry information for the same vacant parking slot 46 has been received from another vehicle (Step S29). In this process, an affirmative determination is made if another vehicle supporting automated parking recognizes the same vacant parking slot 46 at almost the same time as the own vehicle does, and transmits the entry information to the own vehicle.

When determining that the entry information for the same vacant parking slot 46 has been received from another vehicle (YES in Step S29), the parking control device 12 transitions to the process in Step S31. On the other hand, when determining that the entry information for the same vacant parking slot 46 has not been received from another vehicle (NO in Step S29), the parking control device 12 determines whether another vehicle that is entering the same vacant parking slot 46 is present (Step S30). In this process, an affirmative determination is made if another vehicle is entering the same vacant parking slot 46 before the own vehicle is. Here, another vehicle that is entering the vacant parking slot is constantly detected by the rear sonar 112, the camera sensor 113, etc. When determining that another vehicle entering the same vacant parking slot 46 is absent (NO in Step S30), the parking control device 12 performs the automated parking process (Step S35). Note that the "automated parking process" is to implement automated parking in which the vehicle 10 autonomously travels and automatically parks in the vacant parking slot 46, 47. Thus, the parking control device 12 controls an engine and a brake, for example, by transmitting and receiving control signals to and from an engine control device, a brake control device, and the like, thereby implementing automated parking involving autonomous travel.

When determining that the entry information for the same vacant parking slot 46 has been received from another vehicle (YES in Step S29) and when determining that another vehicle that is entering is present (YES in Step S30), the parking control device 12 performs the following process. Specifically, the parking control device 12 compares parking priorities of the own vehicle and another vehicle just mentioned (hereinafter also referred to as "another entering vehicle 44"), each of which is set according to the distance to the vacant parking slot 46, the entry waiting time (parking waiting time), and so on (Step S31). Note that the parking priority of, for example, the vehicle 10, is stored in a predetermined storage region of the memory 122 as data. The stored data of the parking priority is updated on the basis of the relationship between the own vehicle and another vehicle about the distance to the vacant parking slot 46, the entry waiting time, and so on, as described above.

The above parking priority of a vehicle is set as follows. For example, the parking priority is set higher as the distance between the vehicle and a new vacant parking slot 46 is reduced. Furthermore, the parking priority is set higher as the entry waiting time is longer. Moreover, for example, in the case where the own vehicle and another entering vehicle 44 can perform inter-vehicle communication, the parking priority is set as follows. The parking priority is set by combining a priority that is set according to the distance to a new vacant parking slot 46 (hereinafter also referred to as the "first priority") and a priority that is set according to the entry waiting time (hereinafter also referred to as the "second priority"). The parking control device 12 compares the parking priority of the own vehicle and the parking priority of another vehicle which are set as just described. As a result, on the basis of the comparison result, the parking control device 12 determines whether the parking priority of the own vehicle is higher than the parking priority of another vehicle.

If the own vehicle and another entering vehicle 44 cannot perform inter-vehicle communication, the parking control device 12 compares the parking priorities as follows. Specifically, when both the first and second priorities set for the own vehicle are higher than the priority set for another entering vehicle 44, the parking control device 12 determines the parking priority of the own vehicle as being higher than the parking priority of another entering vehicle 44.

On the basis of the result of comparison between the parking priority of the own vehicle and the parking priority of another entering vehicle 44, the parking control device 12 determines whether the parking priority of the own vehicle is higher than the parking priority of another vehicle (Step S32). In other words, in this process, whether the own vehicle can park in a new vacant parking slot 46 is determined according to the parking priority.

When determining the parking priority of the own vehicle as being higher than the parking priority of another entering vehicle 44 (YES in Step S32), the parking control device 12 transitions to the process in Step S35. On the other hand, when determining that the parking priority of the own vehicle is lower than or equal to the parking priority of another entering vehicle 44 (NO in Step S32), the parking control device 12 determines whether to satisfy a status control condition (Step S33). Note that the "status control condition" is a condition that is satisfied when the vacant parking slot 46, 47 is not found. Specifically, the status control condition is that the entry waiting time of the vehicle 10 reaches at least a predetermined time with no vacant parking slot 46, 47 found. Alternatively, the status control condition is that the travel distance of the vehicle 10 reaches at least a predetermined distance with no vacant parking slot 46, 47 found.

Note that the status control condition is not limited to the above conditions. For example, the status control condition may be a combined condition that the entry waiting time of the vehicle 10 reaches at least a predetermined time and the travel distance of the vehicle 10 reaches at least a predetermined distance with no vacant parking slot 46, 47 found. Alternatively, the status control condition may be that consumption of energy of movement of the vehicle 10 reaches at least a predetermined amount with no vacant parking slot 46, 47 found. In other words, it is sufficient that according to the status control condition, the vehicle 10 waiting for parking be properly controlled when the vacant parking slot 46, 47 is not found.

When determining that the status control condition is satisfied (YES in Step S33), the parking control device 12 performs an automated parking status control process (Step S34). In other words, if the vacant parking slot 46, 47 is not found even through the search, the parking control device 12 performs the automated parking status control process. On the other hand, when determining that the status control condition is not satisfied (NO in Step S33), the parking control device 12 returns to the process in Step S26. Furthermore, the parking control device 12 continues to search for a new vacant parking slot 46.

Figure 6:
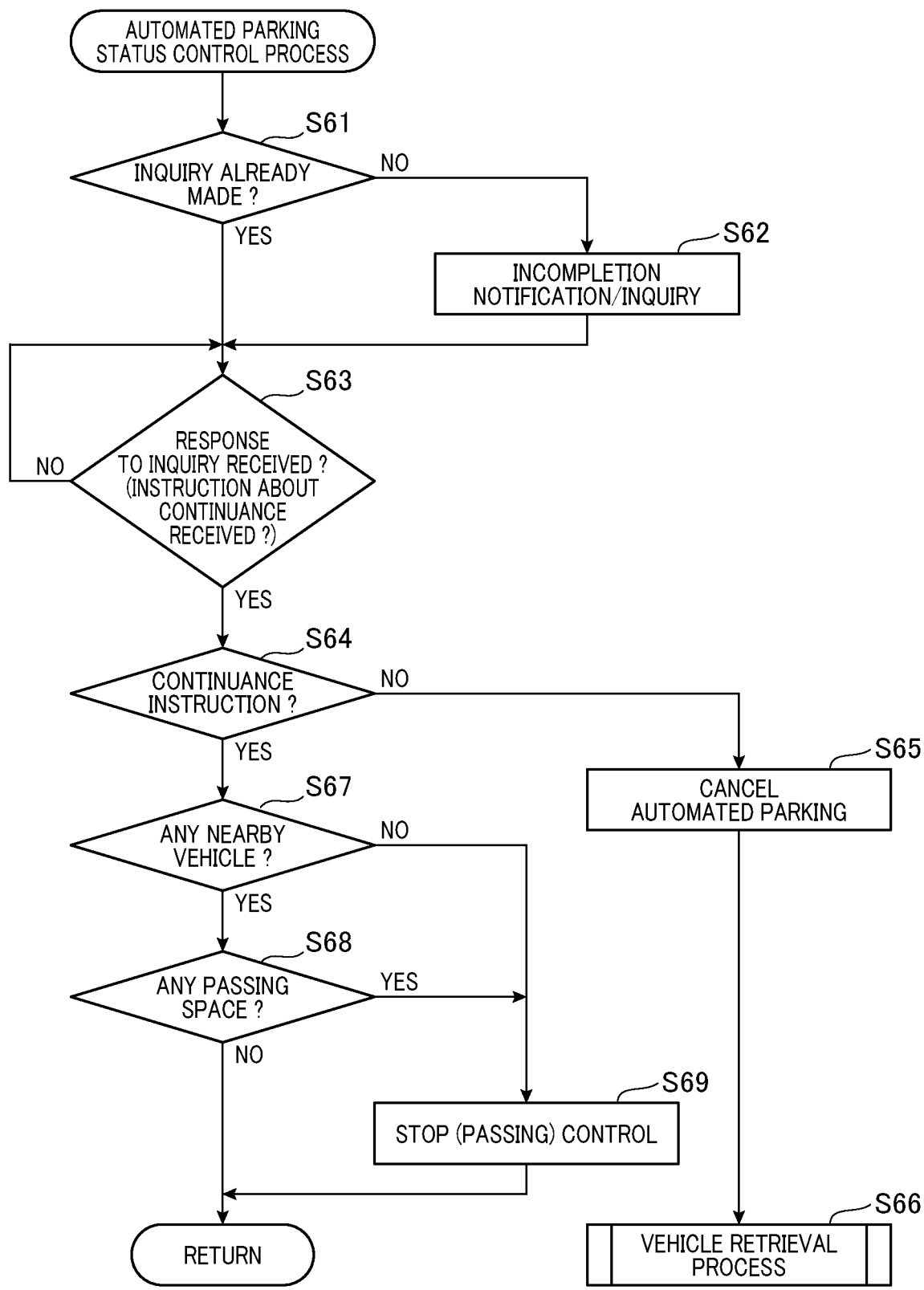
FIG. 6 is a flowchart showing an automated parking status control process according to the embodiment of the present disclosure.

FIG. 6 is a flowchart showing the automated parking status control process (Step S34). The parking control device 12 determines whether an inquiry about the automated parking continuance instruction corresponding to the instruction about the status control of the vehicle 10 has already been made to the information terminal 20 (Step S61). When determining that the inquiry has not already been made (NO in Step S61), the parking control device 12 transmits the information of the status of automated parking from the vehicle 10 to the information terminal 20, and notifies the user that parking is incomplete due to the failure to find the vacant parking slot 46, 47. Furthermore, the parking control device 12 makes an inquiry about the automated parking continuance instruction to the user (Step S62). Note that the vehicle 10 transmits the information to the information terminal 20 via the communication device 14.

FIG. 7 is a flowchart showing the processes in the information terminal 20. Specifically, FIG. 7 illustrates the automated parking control command process. The automated parking control command process is to assist an automated parking control command from a user. For example, when power to the information terminal 20 is turned on, the automated parking control command process is started and then repeatedly performed. In the automated parking control command process, first, the parking control command device 21 determines whether the information of the status of automated parking (i.e., an incomplete parking notification and an inquiry about the automated parking continuance instruction) has been received from the vehicle 10 (Step S71). When determining that the information of the status of automated parking has not been received (NO in Step S71), the parking control command device 21 remains waiting for the reception. On the other hand, when determining that the information of the status of automated parking has been received (YES in Step S71), the parking control command device 21 performs the process in Step S72. Note that the information terminal 20 receives, via the communication device 23, the information transmitted from the vehicle 10. The parking control command device 21 outputs the received status information via the terminal HMI 22 (Step S72). At this time, the terminal HMI 22 displays the status information on a screen or outputs the status information in the form of audio. As a result, the user recognizes that the own vehicle 10 has been failing to find the vacant parking slot 46, 47 (recognizes that parking is incomplete). The user determines whether to continue or cancel the search for a new vacant parking slot 46. Furthermore, the user inputs the determined instruction (instruction about the status control of the vehicle 10) to the information terminal 20. The parking control command device 21 determines whether the instruction input from the user has been received (Step S73). When determining that the instruction input has not been received (NO in Step S73), the parking control command device 21 remains waiting for the input. On the other hand, when determining that the instruction input has been received (YES in Step S73), the parking control command device 21 performs the process in Step S74. Note that the parking control command device 21 receives the instruction input from the user via the terminal HMI 22. On the basis of the input instruction, the parking control command device 21 transmits an automated parking control command (control signal) corresponding to the user instruction from the information terminal 20 to the vehicle 10 (Step S74). Note that the information terminal 20 transmits the control command to the vehicle 10 via the communication device 23. Note that in the case of transmitting the automated parking control command to the vehicle 10, the communication device 23 functions as an instruction unit.

The description returns to FIG. 6. As a response to the inquiry, the parking control device 12 determines whether the automated parking control command has been received from the information terminal 20 (step S63). When determining that the automated parking control command has not been received (NO in Step S63), the parking control device 12 remains waiting for the reception. On the other hand, when determining that the automated parking control command has been received (YES in Step S63), the parking control device 12 performs the process in Step S64. Note that the vehicle 10 receives, via the communication device 14, the control command transmitted from the information terminal 20. The parking control device 12 determines whether the received control command is an instruction to continue automated parking or an instruction to cancel automated parking (Step S64). When determining that the control command is the cancellation instruction (NO in Step S64), the parking control device 12 cancels automate parking (Step S65) and performs a vehicle retrieval process (Step S66). Note that in the vehicle retrieval process, the vehicle 10 that has been waiting for parking stops searching for the vacant parking slot 46, 47 and autonomously travels and stops in a predetermined boarding space.

On the other hand, when determining that the control instruction is the continuance instruction (YES in Step S64), the parking control device 12 determines whether another vehicle (hereinafter also referred to as a "nearby vehicle") is present around the vehicle 10 (Step S67). Note that whether a nearby vehicle is present is determined, for example, by detecting another vehicle present in front of or behind the own vehicle using the rear sonar 112 and the camera sensor 113.

When determining that another vehicle is present around the vehicle 10 (YES in Step S67), the parking control device 12 determines the presence or absence of a passing space in the parking lot (Step S68). Note that the "passing space" is a space in which a vehicle can be temporarily parked in the space in the parking lot that is different from the parking slot 49 and which satisfies a predetermined safety condition. The "predetermined safety condition" includes, for example, a condition that even when the own vehicle is parked in said space, a road width of at least a predetermined length great enough for another vehicle to safely pass is left and said space is not close to an intersection.

When determining that another vehicle is not present around the vehicle 10 (NO in Step S67), the parking control device 12 performs a stop (passing) control on the vehicle 10 to cause the vehicle 10 to be temporarily stopped in a location in which the vehicle 10 is waiting for parking (Step S69). When determining that another vehicle is present around the vehicle 10 and a passing space is present (YES in Step S68), the parking control device 12 causes the vehicle 10 to autonomously travel and performs a stop control in the passing space to cause the vehicle 10 to be temporarily stopped (Step S69). Thereafter, according to the received continuance instruction, in order to search for a new vacant parking slot 46, the parking control device 12 returns to the process in Step S21 shown in FIG. 2.

Figure 2:
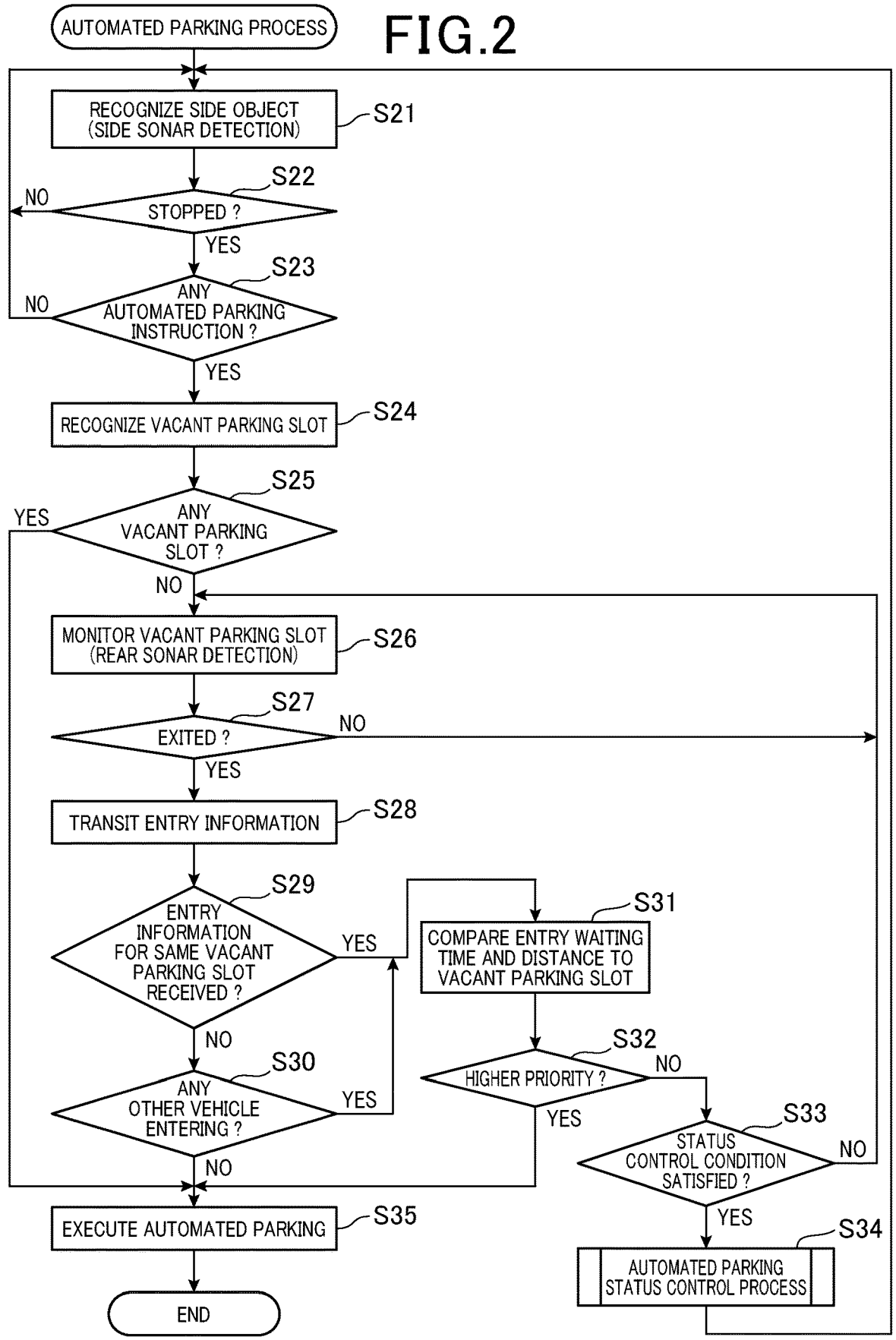
FIG. 2 is a flowchart showing an automated parking process according to the embodiment of the present disclosure.

When determining that the control instruction is the continuance instruction (YES in Step S64), a nearby vehicle is present (YES in Step S67), and no passing space is present (NO in Step S68), the parking control device 12 returns to the process in Step S21 shown in FIG. 2, in order to search for a new vacant parking slot 46.

As described above, with the automated parking system 100 according to the present embodiment, the vehicle 10 supporting automated parking searches for the vacant parking slot 46, 47 in a parking lot by means of autonomous travel. If the vacant parking slot 46, 47 is not found, the vehicle 10 transmits the information of the status of automated parking to the information terminal 20, sending a notification that parking is incomplete. When receiving the notification from the vehicle 10, the information terminal 20 outputs the received status information. On the basis of the output information, the user inputs an instruction about the status control of the vehicle 10 to the information terminal 20. Specifically, this instruction is an instruction to continue or cancel automated parking.

When receiving the input instruction from the user, the information terminal 20 transmits, to the vehicle 10, the automated parking control command corresponding to the user instruction. When receiving the control command from the information terminal 20, the vehicle 10 continues or cancels automated parking according to the received control command In the case of continuing automated parking, the vehicle 10 performs the following process. Specifically, when no nearby vehicle is present or when a passing space is present, the vehicle 10 is temporarily stopped in a space different from the parking slot 49 on the condition that a predetermined safety condition is satisfied. When a nearby vehicle is present and no passing space is present, the vehicle 10 continues to search for a new vacant parking slot 46.

Thus, in the present embodiment, in the automated parking system 100 of the autonomous search type, the vehicle 10 that is waiting for parking can be properly controlled when the vacant parking slot 46, 47 is not found. As a result, with the automated parking system 100 according to the present embodiment, the occurrence of congestion caused by vehicles waiting for parking slots can be reduced. Furthermore, with the automated parking system 100 according to the present embodiment, the energy of which a vehicle waiting for parking consumes by driving until it can park can be reduced. Note that the automated parking system 100 according to the present embodiment can be used as an automated valet parking system of the autonomous search type.

Note that in the above embodiment, a user selects, as the instruction about the status control of the vehicle 10, the instruction to continue automated parking or the instruction to cancel automated parking. However, the techniques according to the present disclosure are not limited to the above embodiment. Another available configuration is that, for example, also when automated parking continues, a user selects whether to continue to search for a new vacant parking slot 46 or to cause the vehicle 10 to be temporarily stopped in a passing space. When the user provides an instruction to continue the search, the vehicle 10 continues to search for a new vacant parking slot 46. When the user provides an instruction to temporarily stop, the vehicle 10 determines the presence or absence of a nearby vehicle, a passing space, etc., and is temporarily stopped.

Furthermore, in the above embodiment, if the time of waiting for parking for the vehicle 10 reaches at least a predetermined time with no vacant parking slot 46, 47 found, the vehicle 10 transmits the information of the status of automated parking to the information terminal 20. Furthermore, if the vehicle 10 has traveled a predetermined distance with no vacant parking slot 46, 47 found, the vehicle 10 transmits the information of the status of automated parking to the information terminal 20. However, the techniques according to the present disclosure are not limited to the above embodiment. Another available configuration is that, for example, in addition to the above configuration, the information terminal 20 makes an inquiry to the vehicle 10 about information of the status of automated parking, and if no vacant parking slot 46, 47 has not been found, the vehicle 10 transmits the status information to the information terminal 20.

Furthermore, in the above embodiment, if no vacant parking slot 46, 47 is found, the vehicle 10 transmits the information of the status of automated parking to the information terminal 20, receives the automated parking control command from the information terminal 20, and thus receives an instruction about the status control of the vehicle 10. However, the techniques according to the present disclosure are not limited to the above embodiment. Another available configuration is that, for example, the instruction about the status control of the vehicle 10 is preset in the vehicle 10. Upon the start of automated parking, in the vehicle 10, a user may input, via the parking control HMI 13, an instruction for when no vacant parking slot 46, 47 is found. In this case, the parking control HMI 13 corresponds to the instruction reception unit. Furthermore, the instruction about the status control of the vehicle 10 may be transmitted from the information terminal 20 to the vehicle 10 before the vehicle 10 receives the instruction from the information terminal 20.

What is claimed is:

1. An automated parking system, comprising:
an information terminal;
a vehicle comprising:
a parking control unit which controls the vehicle to search for and park in a vacant parking slot by means of autonomous travel; and
an instruction reception unit which receives an instruction about status control of the vehicle based on no vacant parking slot being found, wherein
the information terminal includes an instruction unit which provides the instruction to the instruction reception unit, and
the parking control unit is configured to:
determine whether an other entering vehicle that is entering a same vacant parking slot is present based on the vacant parking slot being found as a result of searching;
compare a parking priority of the vehicle and a parking priority of the other entering vehicle in response to determining that the other entering vehicle that is entering is present, and determine whether the parking priority of the vehicle is higher than the parking priority of the other entering vehicle on the basis of a comparison result, the parking priority comprising information that determines whether the vehicle can park in the vacant parking slot;
determine that no vacant parking slot is found in response to determining that the parking priority of the vehicle is lower than or equal to the parking priority of the other entering vehicle; and
control the vehicle according to the instruction received by the instruction reception unit in response to determining that no vacant parking slot being found, wherein
the parking priority of the vehicle is set according to a first entry waiting time of the vehicle,
the parking priority of the other entering vehicle is set according to a second entry waiting time of the other entering vehicle, and
the parking control unit is further configured to determine that the parking priority of the vehicle is lower than or equal to the parking priority of the other entering vehicle in response to the second entry waiting time being longer than the first entry waiting time.

2. The automated parking system according to claim 1, wherein
the vehicle further includes a notification transmission unit which transmits a notification to the information terminal when no vacant parking slot is found, the notification indicating that parking is incomplete,
the information terminal further includes a notification reception unit which receives the notification transmitted by the notification transmission unit,
the instruction unit transmits, to the vehicle, an instruction that has been input by a user in response to the notification received by the notification reception unit, and
the instruction reception unit receives the instruction transmitted from the information terminal.

3. The automated parking system according to claim 1, wherein the instruction is an instruction to continue to search for the vacant parking slot.

4. The automated parking system according to claim 1, wherein
the parking control unit causes the vehicle to autonomously travel to a predetermined location when the instruction is an instruction to cancel search for the vacant parking slot.

5. The automated parking system according to claim 1, wherein
the parking control unit continues to search for the vacant parking slot when the instruction is an instruction to continue to search for the vacant parking slot.

6. The automated parking system according to claim 1, wherein
the parking control unit causes the vehicle to be temporarily stopped in a location different from a parking slot when the instruction is an instruction to continue to search for the vacant parking slot.

7. The automated parking system according to claim 1, wherein
the parking control unit causes the vehicle to be temporarily stopped in a space different from a parking slot when the instruction is an instruction to continue to search for the vacant parking slot and no other vehicle is present around the vehicle.

8. The automated parking system according to claim 6, wherein
when the instruction is the instruction to continue to search for the vacant parking slot, the parking control unit searches for a space different from a parking slot and satisfying a predetermined safety condition and causes the vehicle to be temporarily stopped in the space found as a result of searching.

9. The automated parking system according to claim 2, wherein
when no vacant parking slot is found even after a wait time for parking for the vehicle reaches at least a predetermined time and/or when no vacant parking slot is found even after the vehicle has traveled at least a predetermined distance, the notification transmission unit transmits the notification.

10. The automated parking system according to claim 1, wherein
the parking control unit performs the following:
storing a correspondence relationship between a travel distance of the vehicle and a detected distance into a predetermined storage region before starting automated parking, the detected distance being a distance between the vehicle and another vehicle that is parked; and
recognizing a position of the vacant parking slot among a plurality of parking slots on the basis of the correspondence relationship stored, upon searching for and recognizing the vacant parking slot.

11. An automated parking vehicle, comprising:
a parking control unit which controls the automated parking vehicle to search for and park in a vacant parking slot by means of autonomous travel; and
an instruction reception unit which receives an instruction about status control of the automated parking vehicle based on no vacant parking slot being found, wherein
in response to no vacant parking slot being found as a result of searching, the parking control unit controls the automated parking vehicle according to the instruction received by the instruction reception unit,
the parking control unit is configured to:
determine whether an other entering vehicle that is entering a same vacant parking slot is present based on the vacant parking slot being found as a result of searching;
compare a parking priority of the automated parking vehicle and a parking priority of the other entering vehicle in response to determining that the other entering vehicle that is entering is present, and determine whether the parking priority of the automated parking vehicle is higher than the parking priority of the other entering vehicle on the basis of a comparison result, the parking priority comprising information that determines whether the automated parking vehicle can park in the vacant parking slot;
determine that no vacant parking slot is found in response to determining that the parking priority of the automated parking vehicle is lower than or equal to the parking priority of the other entering vehicle; and
control the automated parking vehicle according to the instruction received by the instruction reception unit in response to determining that no vacant parking slot is found,
wherein
the parking priority of the automated parking vehicle is set according to a first entry waiting time of the automated parking vehicle,
the parking priority of the other entering vehicle is set according to a second entry waiting time of the other entering vehicle, and
the parking control unit is further configured to determine that the parking priority of the automated parking vehicle is lower than or equal to the parking priority of the other entering vehicle in response to the second entry waiting time being longer than the first entry waiting time.

12. An automated parking method, comprising the steps of:
controlling parking by causing a vehicle to autonomously travel and search for and park in a vacant parking slot;
receiving an instruction about status control of the vehicle based on no vacant parking slot being found;
determine whether an other entering vehicle that is entering a same vacant parking slot is present based on the vacant parking slot being found as a result of searching;
compare a parking priority of an vehicle and a parking priority of the other entering vehicle in response to determining that the other entering vehicle that is entering is present, and determine whether the parking priority of the vehicle is higher than the parking priority of the other entering vehicle on the basis of a comparison result, the parking priority comprising information that determines whether the vehicle can park in the vacant parking slot;
determine that no vacant parking slot is found in response to determining that the parking priority of the vehicle is lower than or equal to the parking priority of the other entering vehicle; and
controlling the vehicle according to the received instruction in response to determining that no vacant parking slot is found as a result of searching, wherein
the parking priority of the vehicle is set according to a first entry waiting time of the vehicle,
the parking priority of the other entering vehicle is set according to a second entry waiting time of the other entering vehicle, and the parking priority of the vehicle is determined to be lower than or equal to the parking priority of the other entering vehicle in response to the second entry waiting time being longer than the first entry waiting time.

13. The automated parking system according to claim 1, wherein the parking priority of the vehicle is set according to a first distance to the vacant parking slot from the vehicle, the parking priority of the other entering vehicle is set according to a second distance to the vacant parking slot from the other entering vehicle, and the parking control unit is configured to determine that the parking priority of the vehicle is lower than or equal to the parking priority of the other entering vehicle in response to the second distance being smaller than the first distance.

14. The automated parking system according to claim 1, wherein the vehicle further includes a communication device which causes data to be transmitted and received between the other entering vehicle and the vehicle, and in response to determining that a parked vehicle has exited, the parking control unit is configured to transmit using the communication device, to the other entering vehicle, entry information which includes at least a position of a new vacant parking slot.

\* \* \* \* \*